United States Patent [19]
MacDonald

[11] 3,915,268
[45] Oct. 28, 1975

[54] CLUTCH-BRAKE UNIT

[75] Inventor: J. G. Fraser MacDonald, Rockford, Ill.

[73] Assignee: Warner Electric Brake & Clutch Co., Beloit, Wis.

[22] Filed: Dec. 16, 1974

[21] Appl. No.: 532,838

[52] U.S. Cl. ............ 192/12 BA; 192/36; 192/81 R; 74/230.14
[51] Int. Cl.² ........................................ F16D 67/02
[58] Field of Search ........... 192/12 BA, 17 D, 33 C, 192/35, 36, 26, 81 R

[56] References Cited
UNITED STATES PATENTS

| 3,006,448 | 10/1961 | Fox .................................. 192/81 R |
| 3,025,365 | 3/1962 | Goodhouse et al. ........... 192/12 BA |
| 3,302,762 | 2/1967 | Conlon ............................. 192/81 R |
| 3,572,481 | 3/1971 | Moritz ................................. 192/26 |

Primary Examiner—Benjamin W. Wyche
Attorney, Agent, or Firm—Wolfe, Hubbard, Leydig, Voit & Osann, Ltd.

[57] ABSTRACT

A clutch-brake unit includes an input hub fixed on a rotatable shaft and an output hub journaled on the shaft. A coil spring normally is wound into torque transmitting engagement between the hubs so the output hub rotates with the input hub and the shaft during the normal drive mode of the unit. Telescoped over the spring is a sleeve which has one end fixed to the output hub for rotation therewith and an opposite free end portion. Mounted around the free end portion of the sleeve is a braking disk with interior lugs extending radially inward and into generally helical slots formed through the sleeve. A tang extending radially outward from the input end of the spring is captivated within one of the slots between the lug and the axially inward end of that slot and is urged outwardly in a generally axial direction against the lug by an axially expanded convolution in the input end of the spring. When braking, a frictional brake shoe is moved in an axially inward direction to frictionally engage and to slide the disk inwardly against the expanded convolution so that, in turn, the tang is slid along the slot thereby unwinding the spring to positively declutch the unit even though it may be under a static load condition.

15 Claims, 7 Drawing Figures

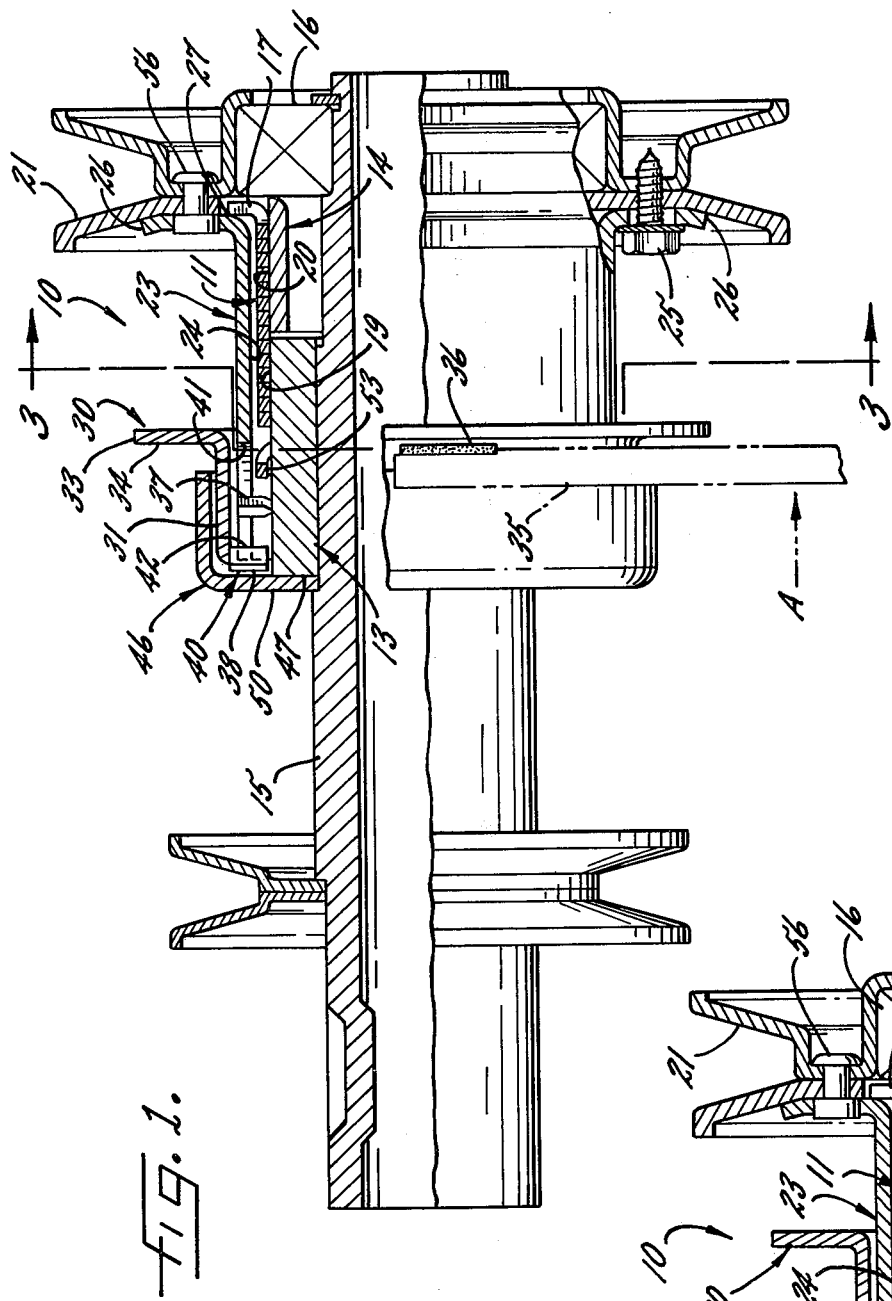
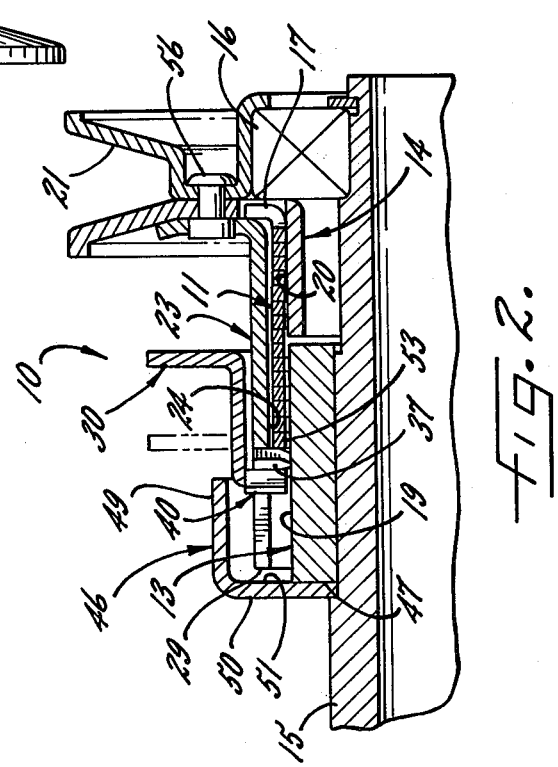

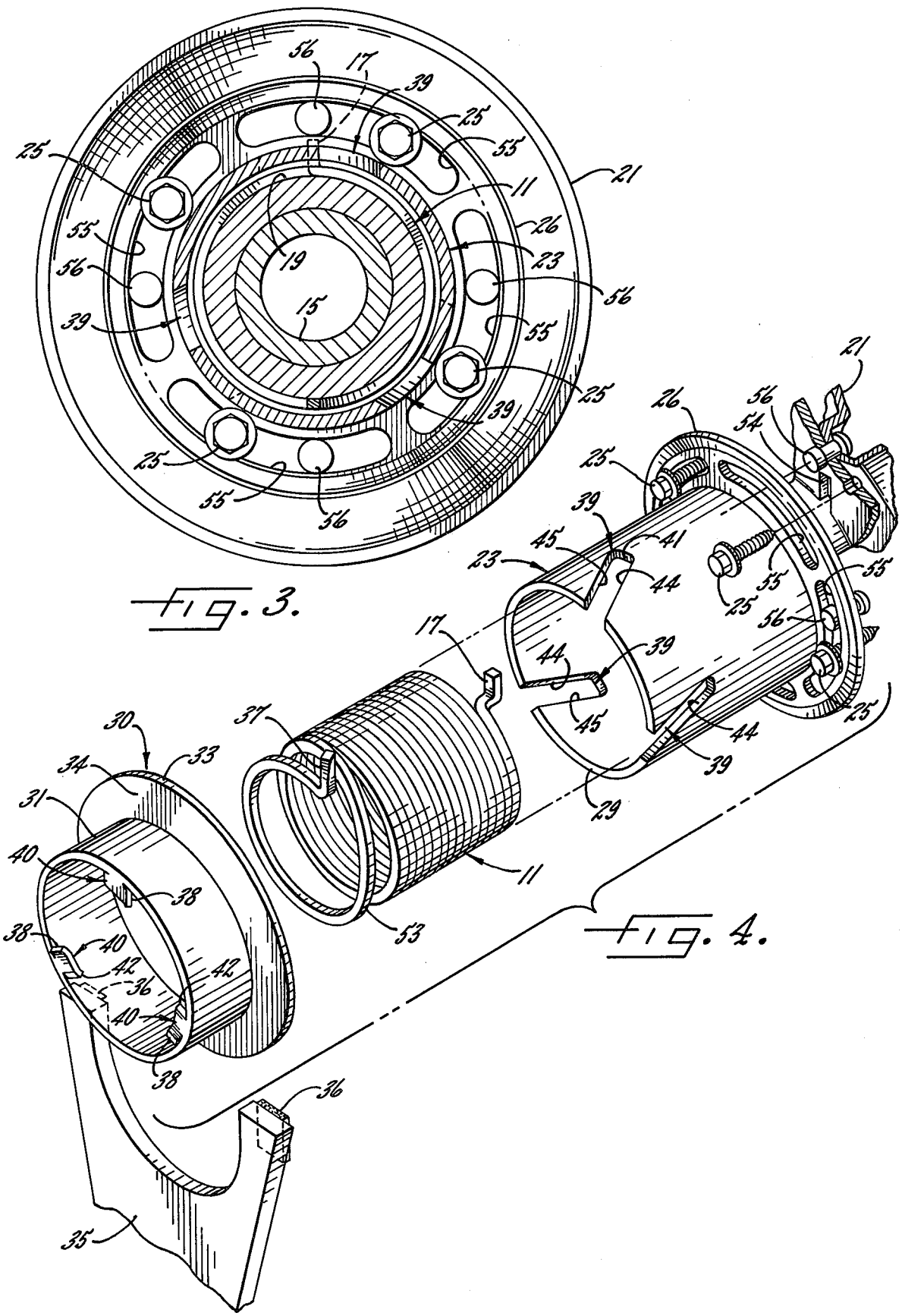

3,915,268

CLUTCH-BRAKE UNIT

BACKGROUND OF THE INVENTION

This invention relates to a clutch-brake unit of the type employing a coil spring to transmit torque between the drive surfaces of input and output hubs which are mounted on a rotatable shaft. More particularly, the invention relates to a unit in which the input hub is fixed on the shaft and the output hub is journaled on the shaft for rotation relative to the shaft when the spring is disengaged from the drive surfaces. Normally, the coil spring is wound into torque transmitting engagement between the drive surfaces of the two hubs so the output hub rotates with the input hub.

In one clutch-brake assembly, such as is disclosed in an application Ser. No. 500,343, filed Aug. 26, 1974 and entitled Clutch Brake Unit, a sleeve fixed to the output hub is telescoped over and spaced from the spring and supports a braking member loosely within the assembly for slight axial movement toward and away from the input end of the spring. When declutching and braking in this clutch-brake assembly, a yoke is slid into frictional engagement with the braking member thereby sliding the latter axially inward to engage the input end of the spring so that relative rotation between the braking member and the output hub unwinds the spring thereby declutching the assembly. If, however, a motor driving the rotatable shaft has stalled in a static load condition, such as when the output hub has been overloaded, movement of the yoke against the braking member fails to produce declutching in the assembly simply because both the input and output hubs are stalled under the static load with the shaft. As a result, when attempting to restart the stalled motor while under the static load, the coil spring may be burned-out or seriously weakened unless the load is removed or the assembly is declutched prior to trying to start the motor.

SUMMARY OF THE INVENTION

The primary aim of the present invention is to provide a new and improved clutch-brake unit of the above general character which is positively declutched as an incident to braking regardless of whether or not the unit is under a static or opposing load condition. A more detailed object of the present invention is to accomplish the foregoing through the provision of a unique coupling between the braking member and the sleeve so that, during braking as the braking member is slid inwardly by the yoke to engage the input end of the spring, the member positively is turned relative to the sleeve so as to positively unwind the spring from the input hub even though the unit may be under a static load condition with the motor stalled.

The invention also resides in the novel manner in which the braking member is mounted on the sleeve so that lugs on the member ride within helical slots in the sleeve during braking to engage the input end of the spring and positively unwind the latter from the input hub.

Still further the invention resides in the novel construction of the means for mounting the sleeve on the output hub to adjust the angular position of the slots relative to the input end of the spring so one of the slots receives the input end of the spring regardless of tolerance variations between the diameter of the spring and the diameters of the drive surfaces normally engaged by the spring.

These and other objects and advantages of the present invention will become more apparent from the following detailed description when taken in conjunction with the accompanying drawings.

BRIEF DESCRIPTION OF THE DRAWINGS

FIG. 1 is an elevational view of a clutch-brake unit embodying the novel features of the present invention with portions thereof broken away and shown in cross section.

FIG. 2 is a fragmentary cross-sectional view similar to FIG. 1 but showing parts of the clutch-brake unit in moved positions.

FIG. 3 is a cross-sectional view taken substantially along line 3—3 of FIG. 1.

FIG. 4 is a fragmentary exploded perspective view of parts of the clutch-brake unit of the present invention.

DETAILED DESCRIPTION OF THE PREFERRED EMBODIMENT

Figure 5:
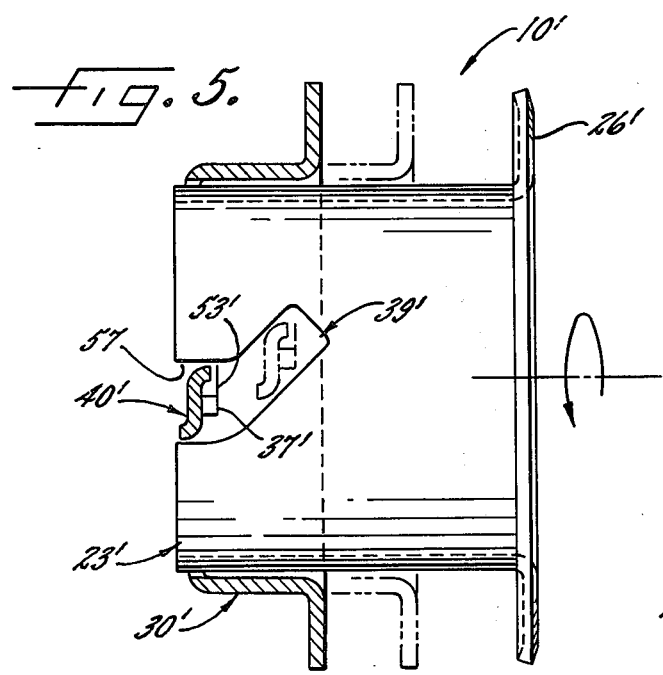
FIG. 5 is a fragmentary elevational view of an alternative form of the present invention.

As shown in the drawings for purposes of illustration, the present invention is embodied in a clutch-brake unit 10 particularly adapted for use under high speed and high inertia load conditions such as occur in the normal operation of a lawn and garden tractor (not shown). Herein, the exemplary clutch-brake unit is the type utilizing a coil spring 11 to form a torque transmitting connection between the input and output hubs 13 and 14 mounted on a rotatable shaft 15 such as may be driven by the motor (not shown) of the tractor. The hubs are spaced slightly end to end from each other on the shaft with the input hub being fixed on the shaft to rotate bodily with the shaft. Bearings 16 support the output hub rotatably on the shaft so the output hub may be stopped while the shaft continues to rotate. Normally, the spring is wound into torque-transmitting engagement between the two hubs with the output end of the spring being fixed to the output hub by way of a tang 17. Accordingly, when the input end of the spring is rotated relative to the output end, the spring is unwound from the hubs thereby declutching the assembly so rotation of the output hub may be halted without also having to stop rotation of the input hub and the shaft by simply applying a braking torque to the output hub.

As shown in FIGS. 1 and 2, the input and output hubs 13 and 14 are both cylindrical in shape and include outer drive surfaces 19 and 20, respectively, which are spaced equal distances radially from the central axis of the shaft 15. Herein, the relaxed diameter of the spring 11 is smaller than the diameter defined by the drive surfaces so that the latter are engaged frictionally by the spring to provide the torque-transmitting connection between the two hubs. Integrally formed with the output hub 14 and extending around the bearings 16 is a large sheave or pulley 21 adapted to connect drivingly with an implement (not shown) of the tractor. Projecting in an axial direction from the pulley and toward the input hub is a cylindrical sleeve 23 having an interior surface 24 which is spaced radially outward from the drive surfaces 19 and 20 of the hubs to leave room for the spring to unwind outwardly from the drive surfaces when declutching the unit 10. The sleeve is fixed to the pulley by four screws 25 (see FIG. 3) projecting through an annular flange 26 which is integrally formed with and extends radially outward from one end 27 of the sleeve. Telescoped onto the opposite or free end 29 (see FIGS. 2 and 4) of the sleeve is a braking member 30 in the form of a disk. The latter is connectable with the input end of the spring to unwind the spring from the drive surfaces 19 and 20 of the hubs 13 and 14 when a braking torque is applied to the disk.

Preferably, the disk 30 is formed with a cylindrical center section 31 which is telescoped over the free end portion of the sleeve 23 so that the inner end of the center section is spaced axially inward from the free end 29 of the sleeve. Integrally formed with the inner end of the center section is an annular flange 33 which extends radially outward from the section to provide an outside brake surface 34 for engagement by a generally Y-shaped brake shoe 35. The latter is mounted on the tractor for movement into and out of engagement with the disk by operation of a pull cable (not shown). In the normal drive mode of the unit 10, the hubs 13 and 14 rotate together but, when applying the brake, the brake shoe is moved in the direction of the arrow A (see FIG. 1) to engage the disk and to push the disk axially inward, that is, in a generally axial direction with respect to the two hubs, by the shoe and into a torque-transmitting connection with the output hub. Two diametrical wear pads 36 on the brake shoe frictionally engage the outside surface 34 of the disk to retard rotation of the disk with the shaft 15 and this, in turn, retards the rotation of the output hub with the shaft by virtue of the torque-transmitting connection between the disk and the output hub. At the same time, the connection of the disk with the input end of the spring causes the input and output ends of the spring to rotate relative to each other to unwind the spring from the drive surfaces 19 and 20 thereby declutching the assembly.

In normal usage of a lawn and garden tractor employing a clutch-brake unit 10 of the type described thus far, the motor of the tractor may be stalled under a static load with the spring 11 locked against the input and output hubs 13 and 14 when an unusually large load is encountered, such as when mowing in very thick, tall grass or weeds which accumulate and jam the cutting blade within the mower section of the tractor. Under the foregoing conditions, severe damage may be caused to the unit by burning out the spring between the hubs when attempting to restart the motor without first declutching the unit. In accordance with the primary aspect of the present invention, provision is made of a novel coupling between the braking member or disk 30, the sleeve 23 and the spring 11 whereby the unit is positively declutched when the brake is applied even though the unit may be under a static load condition, thereby avoiding the possibility of damaging the unit when attempting to restart the motor. For this purpose, guide and follower means formed on the disk and sleeve cooperate to rotate the disk relative to the sleeve during braking and a member 37 connects the input end of the spring with the guide means so the input end is rotated with the disk to unwind the spring from the input hub. By virtue of this arrangement, the unit is positively declutched during braking even though the unit may be under a static load condition. Accordingly, the motor of the tractor may be restarted without possibly damaging the clutch-brake unit such as otherwise may occur when trying to start the motor under a static load when the spring is locked against the input and output hubs.

In the present instance, the guide and follower means comprises a plurality of generally helical slots 39 (see FIG. 4) formed in the free end portion 29 of the sleeve 23 and an equal number of mating lugs 40 integrally formed with the disk 30 and extending into the slots. Forming the member 37 which connects the guide and follower means with the sleeve is a tang 37 which extends radially outward from an integral connection with the input end of the spring. The tang is captured within one of the slots between the inward end 41 thereof and the lug 40 which extends into that slot. Preferably, the tang is urged resiliently against the lug so that, when the disk is slid axially inward on the sleeve by the brake shoe 35, the tang is pushed along the slot thereby turning the input end of the spring relative to the output end so as to unwind the spring from engagement with the drive surface 19 of the input hub 13 and positively declutch the unit 10.

As shown more particularly in FIG. 4, there are three of the slots 39 formed in the free end portion 29 of the sleeve 23 and the slots are spaced equal distances from each other angularly around the sleeve. Moreover, each slot is formed completely through the side sleeve with the outward end of each slot opening in a generally axial direction from the free end of the sleeve. Upon progressing parallel with each other and generally toward the fixed end 27 of the sleeve, the slots are slanted in a direction which is counter to the normal direction of rotation of the shaft 15 and the input hub 13. As a result, the inward end 41 of each slot is spaced circumferentially behind its outward end as referenced to the normal direction of rotation of the shaft.

The three lugs 40 are formed integrally with the outward end of the center section 31 of the braking disk 30 and project radially inwardly therefrom into the slots 39. Herein, each lug extends generally diagonally across its respective slot with the rotationally leading end portions 38 of the lugs being bent in a generally axial direction outwardly from the sleeve to extend parallel with the adjacent sides 44 of the slots. In a somewhat similar manner, the rotationally trailing end portions 42 of each lug are bent inwardly to extend parallel with the sides 45 of the slots adjacent those ends of the lugs. Accordingly, each lug is of a generally S-shaped configuration extending diagonally across its respective slot and engaging the opposite sides of such slot.

As shown in FIGS. 1 and 2, a generally cylindrical dust cover 46 mounted on the shaft 15 adjacent the outward end 47 of the input hub 13 keeps the lugs 40 from sliding axially out of the slots 39. Herein, the cover comprises a tubular wall 49 telescoped over and concentric with the center section 31 of the disk 30. Integrally formed with the axially outward end of the tubular wall is a generally radial wall 50 which extends inwardly therefrom in a generally radial direction and along the outward end of the input hub to abut the shaft. The space between the inward surface 51 of the radial wall and the free end 29 of the sleeve 23 is less than the axial distance between the ends 38 and 42 of the lugs so that the lugs are captivated within the slots to hold the disk for rotation with the sleeve. By virtue of the direction in which the helical slots are slanted, the force of rotation of the sleeve during the drive mode of the unit 10 urges the lugs to ride inwardly along the slots and out of frictional contact with the inward surface 51 of the radial wall 50.

In carrying out the present invention so that the spring 11 is unwound from the input hub 13 as an incident to applying an axially directed force to the disk 30, an axially expanded convolution 53 (see FIGS. 1 and 4) is formed in the input end portion of the spring. Advantageously, the expanded convolution urges the input tang 37 away from the inward end 41 of its slot 39 and into engagement with the lug 40 captivated within that slot. When the disk is slid inwardly by the brake shoe 35, the convolution is collapsed (see FIG. 2) with the input tang riding along the slot so that the input end of the spring is turned relative to its output end thereby unwinding the spring from the input hub and declutching the unit 10 regardless of whether the unit is under a static load condition. Once the convolution is collapsed fully with the input tang abutting the inward end of the slot, the disk is then locked with the sleeve 23 thereby forming a frictional brake with the output hub 14.

To avoid frictional contact between the input end portion of the spring 11 and the input hub 13 as the convolution 53 is collapsed, the interior surface of the input end portion of the spring including the expanded convolution is spaced radially outward from the drive surface 19 of the input hub. While this may be achieved with other structural arrangements, in the exemplary form of the invention, the spacing is provided by constructing the input end portion of the spring with its two axially outward convolutions having a relaxed diameter greater than the diameter defined by the drive surface of the input hub. Accordingly, the axially expanded convolution of the spring is free to move axially without engaging the drive surface of the input hub.

When assemblying the clutch-brake unit 10 of the present invention, it will be appreciated that the relative angular positions of the output and input tangs 17 and 37 of the spring 11 may not always be the same from one unit to the next because of tolerance variations in the diameter of the spring and the diameters of the input and output hubs 13 and 14. In accordance with another aspect of the present invention, provision is made for adjustment in the angular positioning of the tang receiving slot 40 of the sleeve 23 relative to the output tang 17 to avoid undue strain on the input tang 37 which otherwise may affect the frictional grip of the spring against the drive surfaces 19 and 20 of the input and output hubs 13 and 14. To this end, the output tang fits within a tang notch 54 formed in the pulley 21 adjacent the fixed end 27 of the sleeve and is captivated in the notch by the flange 26 of the sleeve so as to be held fixed against movement relative to the output hub. In addition, arcuate openings 55 formed in the flange 26 receive rivets 56 extending in a generally axial direction through the two halves of the pulley to hold the pulley together. The outward ends of the rivets define studs which serve to pilot the sleeve concentrically with the input and output hubs to permit rotational adjustment in positioning the slots 40 relative to the output tang. Accordingly, when mounting the sleeve on the pulley, the sleeve is rotated relative to the input end of the spring until one of the slots receives the input tang 37 without such tang being urged substantially out of its natural angular position relative to the output tang. Once the sleeve is positioned properly on the pulley, the screws are tightened against the flange thereby securing the sleeve to the pulley.

Figure 6:
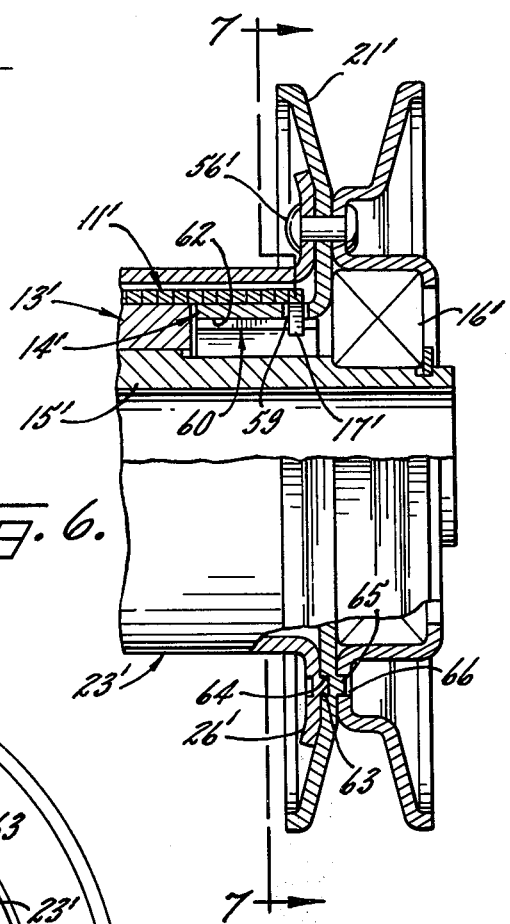
FIG. 6 is a fragmentary elevational view of the alternative form of the invention with parts broken away and shown in cross-section.
Figure 7:
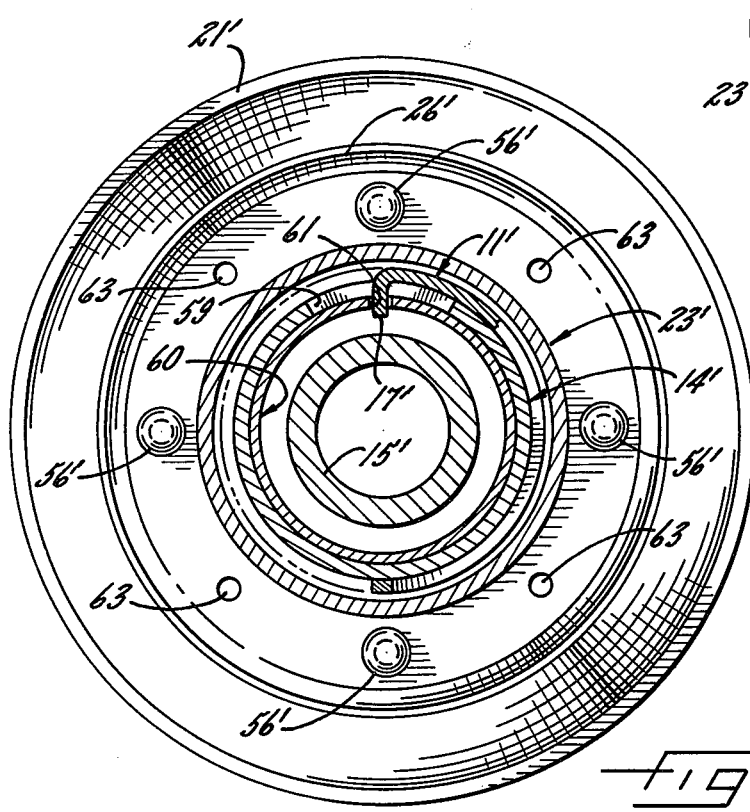
FIG. 7 is a cross-sectional view taken substantially along line 7—7 of FIG. 6.

An alternative form of the present invention is illustrated in FIGS. 5, 6 and 7 wherein parts corresponding to the first form of the invention are identified by the same but primed reference numbers. In the alternative embodiment, the clutch-brake unit 10' is formed with the sleeve 23' having axially extending outer end portions 57 (see FIG. 5) of each of the generally helical slots 39'. By virtue of this construction, the lugs 40' of the brake disk 30' ride within the outer end portions of the slots under the urging of the spring tang 37' during the normal running mode of the unit. Accordingly, the brake disk is kept from tending to slide along the slots and toward the output end of the sleeve as the latter is periodically accelerated to rotate at high speed by reason of the power pulses of the motor. This is because the outer end portions 57 of the slots are shaped to keep from introducing an axially directed component of the torsional power pulses against the expanded end portion 53' of the spring 11'. As a result, the spring is kept from tending to be unwound by the braking disk during the normal drive mode of the tractor.

To provide for adjustment in the angular positioning of the tang receiving slots 39' relative to the spring 11' in the clutch-brake unit 10', the output tang 17' (see FIG. 6) is bent radially inward and extends through an arcuate opening 59 formed through the output hub 14' and extending concentric with the shaft 15'. The length of the opening enables the spring to frictionally grip the input and output hubs 13' and 14' without placing an undue strain on the spring tangs 17' and 37'. Once the spring is assembled with the input and output hubs with the input tang extending into one of the slots 39' and output tang extending into the opening 59, a cylindrical spring clip 60 having an axial slit 61 (see FIG. 7) is telescoped into the output hub to hold the output tang against circumferential movement within the opening. Herein, the relaxed outer diameter of the clip is greater than the inside diameter of the output hub to frictionally grip the inside surface 62 of the output hub. When telescoping the clip into the output hub, the slit is aligned with the output tang of the spring to receive the tang and hold it against movement within the opening during operation of the clutch-brake unit 10'.

As shown in FIG. 6 when assemblying the clutch-brake unit 10', corresponding nibs 63 and recesses 64 are formed at angularly spaced positions in the flange 26' of the sleeve 23' and the inside half of the pulley 21'. The nibs extend axially outward from the flange to nest within the recesses formed in the inside half of the pulley and thus pilot the sleeve concentrically with the pulley. In a similar manner, the inside half of the pulley is provided with nibs 65 which extend into apertures 66 in the outside half of the pulley piloting the two halves of the pulley together so the three parts are aligned concentrically with each other to receive rivets 56' which secure the parts together.

It will be appreciated from the foregoing that the present invention brings to the art a unique clutch-brake unit 10 which is positively declutched during braking by virtue of the novel coupling between the brake disk 30, the sleeve 23 and the spring 11 ever though the unit may be under a static load condition. Advantageously, this is accomplished by mounting the disk on the free end portion 29 of the sleeve so that, as the disk is pushed in an axially inward direction by the brake shoe 35, the input tang 37 is pushed along one of the helical slots 39 thereby causing the spring to be unwound from the input hub 13 regardless of whether the unit is under a static load condition.

We claim as our invention:

1. A clutch-brake unit having relatively rotatable input and output hubs, a sleeve telescoped with and spaced radially from said input and output hubs, said sleeve having one free end and an opposite end fixed to rotate with said output hub, a helical spring normally wound into torque-transmitting engagement between said hubs, said spring having an input end disposed adjacent said input hub and an output end secured to said output hub, a braking disk supported on the free end of said sleeve, a movable brake shoe mounted adjacent said disk to engage and slide said disk relative to said sleeve in a generally axial direction during braking, guide and follower means on said sleeve and said disk and adapted to cause said disk to turn relative to said sleeve as an incident to said sliding movement, and a member connecting the input end of said spring with said means so the input end of said spring is turned with said disk as the latter is turned during braking thereby to unwind said spring from said input hub to positively declutch said unit even though said unit may be under a static load condition.

2. A clutch-brake unit including relatively rotatable input and output hubs, a helical spring normally wound into torque-transmitting engagement between said input and output hubs, a sleeve telescoped over said spring and having one end fixed to rotate with said output hub and an opposite free end portion, a braking disk captivated on the free end portion of said sleeve for sliding movement in a generally axial direction relative to said sleeve between inward and outward positions, means yieldably urging said disk normally into said outward position, a frictional brake shoe mounted adjacent said disk and being movable during braking to engage said disk, to overcome said means and slide the disk on said sleeve into said inward position, and means for positively declutching said unit during braking and to form a torque-transmitting coupling between said disk and said sleeve, said latter means including a generally helical slot formed in said sleeve and slanted counter to the normal direction of rotation of said input hub upon progressing inwardly in a generally axial direction with respect to said sleeve, a lug integrally formed with said disk and extending into said slot, and a tang integrally formed with the input end portion of said spring and extending into said slot for engagement by said lug to be pushed thereby along said slot as said disk is slid into said inward position during braking to unwind said spring from said input hub thereby to positively declutch said unit even though it may be under a static load condition.

3. A clutch-brake unit including relatively rotatable input and output hubs, a helical spring normally wound into torque-transmitting engagement between said hubs, a sleeve telescoped with said spring and fixed to rotate with said output hub, a braking disk captivated on said sleeve for axial movement between first and second positions on said sleeve, means yieldably urging said disk normally into said first position, a friction brake shoe adapted to engage said disk to overcome said means and to move the disk into said second position as an incident to applying a braking torque to said disk, and means for positively declutching said unit as an incident to moving said disk into said second position, said latter means including generally helical guide and follower means formed on said sleeve and said disk so that upon moving from said first position toward said second position said disk follows a generally helical path slanted counter to the normal direction of rotation of said input hub and thus is turned relative to said sleeve, and a member connecting the input end of said spring with said guide and follower means so said member also follows said path during movement of said disk to unwind said spring from said input and output hubs as said disk is moved from its first position toward its second position thereby to positively declutch said unit even though said unit may be under a static load condition.

4. A clutch-brake unit as defined by claim 3 wherein said guide and follower means includes a plurality of angularly spaced slots formed in said sleeve, each of said slots extending along separate generally helical paths slanted counter to the normal direction of rotation of said input hub, a plurality of angularly spaced lugs numbering no more than the number of slots, said lugs being integrally formed with said disk to extend into said slots so said disk is turned relative to said sleeve as said disk is moved inwardly from its first position into its second position.

5. A clutch-brake unit as defined by claim 4 wherein said connecting member comprises a tang integrally formed with the input end of said spring and extending in a generally radial direction outwardly into one of said slots for engagement by one of said lugs to be moved along said slot by said lug as said disk is slid inwardly on said sleeve thereby unwinding said spring.

6. A clutch-brake unit as defined by claim 5 wherein said means yieldably urging said disk comprises an axially expanded convolution in the input end of said spring.

7. A clutch-brake unit as defined by claim 6 with said convolution having a relaxed diameter greater than the diameter of said input hub.

8. A clutch brake unit as defined by claim 6 wherein said slots each include an outer end portion extending in a generally axial direction with respect to said sleeve.

9. A clutch-brake unit as defined by claim 6 wherein said disk includes a generally cylindrical center section telescoped over the free end portion of said sleeve, a flange integrally formed with the inward end of said cylindrical section and extending outwardly thereof in a generally radial direction for engagement with said brake shoe, said lugs being integrally formed with the opposite end of said cylindrical section and extending inwardly therefrom in a generally radial direction beyond the free end of said sleeve and into said slots.

10. A clutch-brake unit as defined by claim 9 with each of said lugs having a generally S-shaped configuration to fit in a generally lateral direction across their respective slots.

11. A clutch-brake unit as defined by claim 10 including a generally cylindrical cover fixed on said input hub and telescoped over the cylindrical center section of said disk.

12. A clutch-brake unit as defined by claim 6 including a concentric sheave secured to said output hub and extending radially outward therefrom, means to pilot said sleeve on said sheave concentric with the axis of said shaft and for angular adjustment in positioning said helical slots relative to the input end of said spring so said tang projects into one of said helical slots.

13. A clutch-brake unit as defined by claim 12 wherein said means to pilot said sleeve on said sheave includes a plurality of angularly spaced studs fixed to said sheave and projecting in a generally axial direction therefrom toward said input hub, an annular flange integrally formed with said one end of said sleeve and extending radially outward therefrom, a plurality of circumferentially extending, angularly spaced openings formed through said flange, said studs extending into said openings to pilot said sleeve concentrically with said sheave and said hubs for angular positioning of said helical sleeve slots relative to said spring, a plurality of screws securing said sleeve to said sheave through said slots after positioning said sleeve on said sheave.

14. A clutch-brake unit as defined by claim 12 wherein said means to pilot said sheave on said sheave for angular adjustment in positioning said slots relative to said tang includes an elongated arcuate opening formed through said output hub, an output tang integrally formed with said spring and projecting in a generally radial direction through said opening, a clip connected between said output tang and said output hub to hold said tang against movement within said opening with said input tang located in one of said slots.

15. A clutch-brake unit as defined by claim 14 with said output hub having a cylindrical inside surface of a predetermined diameter, said clip being a generally cylindrical spring having a relaxed diameter greater than said predetermined diameter and an axial slit extending along the entire length thereof, said spring being telescoped into said output hub to frictionally grip the inside surface thereof with said output tang extending into said slit and captivated thereby against movement within said opening.

* * * * *